Patented Mar. 8, 1938

2,110,803

UNITED STATES PATENT OFFICE 2,110,803

RESINOUS PRODUCTS AND PROCESS OF MAKING SAME

Wilhelm Krumbhaar, Detroit, Mich., assignor to Helmuth Reichhold, Detroit, Mich., doing business as Reichhold Chemicals No Drawing. Application March 5, 1936, Serial No. 67,372

7 Claims. (Cl. 260—8)

The invention relates to resinous products and the process of making same, and is based on the use of resinous hydroxy acids such as are present in natural gums.

Resinous products of excellent technical value are made on the base of polybasic acids and polyhydric alcohols, introducing at the same time other fatty or resinous bodies as modifying agents. The alkyd resins made in this way combine good film forming properties, high elasticity, and unusual weather resistance. To obtain these valuable results the presence of polybasic acids has been regarded as an indispensable condition up to now. This limitation always has been considered as a serious disadvantage because the number of commercially available polybasic acids is small, and the price is comparatively high.

I have found that high grade resinous products of alkyd character can be made by at least partially replacing the polybasic acids in these resins by resinous hydroxy acids such as are present in natural gums. The presence of hydroxyl groups in the resinous acids of either recent or fossil natural gums can be shown by way of acetylating or benzoylating. The chemical reason for the surprising effect in using natural hydroxy acids lies in the fact that hydroxy acids supply the two reactive points necessary for alkyd resin formation in the same way as dibasic acids. In the resin forming reaction the hydroxyl group of the natural hydroxy acid reacts with the glycerol forming an ether by liberation of water, so acting in the place of one of the carboxyl groups of dibasic acids. Generally speaking alkyd resin formation takes place if the interacting molecules are poly-reactive. However, alkyd resins of good technical properties are only obtained if the relative position of the reactive points fulfill certain conditions. For instance the flexibility of the resins increases with the distance of the reactive points from each other. The relative position and distance of the hydroxyl and carboxyl groups respectively in natural hydroxy acids is especially favorable. As a matter of fact this favorable constellation explains the formation and existence of the resins as such.

The hydroxy acids of natural gums as well as hydroxy acids generally are heat sensitive and their complicated structure is gradually destroyed if the natural gums are heated up higher than 240° C., as is done by fusing them. This is the reason why all efforts to make resinous products of alkyd character from natural gums have failed up to the present moment. All previous methods either fused or cracked the natural gum previous to working it into the resinous complex or applied in the resin forming process a temperature that was higher than 240° C., so that fusing of the gum and corresponding decomposition took place in the process itself. In all cases the hydroxy acids were destroyed and in consequence of this heat decomposition the resulting resinous product did not have the technical value of alkyd resins in drying, hardness and elasticity. On the other hand, application of high heat and fusing was necessary in order to make the natural gums sufficiently soluble and reactive for most technical purposes. In some exceptional cases natural gums such as Congo copal may be worked into molding compounds at lower temperatures. However, those materials are not homogeneous resinous products and require homogenizing by heat and pressure in the molding process.

My new process does not apply high temperatures which lead to cracking of the gum and decomposition of the hydroxy acids. It requires only the temperatures usually applied for making alkyd resins, not exceeding 230° C. As experience has shown, temperatures higher than 240° C. break down the structure of alkyd resins and destroy their valuable technical properties.

In order to make natural gums soluble and reactive in the alkyd formation process they may be first treated by a method of mastication such as is described in United States Patent No. 2,007,333. Mastication means a distorting of the gum while in the plastic state by a mechanical action by which the internal structure is broken down both physically and chemically. The treatment takes place on heated roller mills, suitable types of mixers or other suitable devices. Temperature, mechanical pressure and time of mastication have to be adapted to the particular resin so as to produce the most efficient breakdown of the structure. A gum widely used for this purpose is the Congo copal, requiring a temperature of 80 to 100° C., a time of 1 to 2 hours, and pressure as high as possible in the type of machinery used. Under these conditions large molecular aggregates are broken down making the material soluble and reactive but without destroying the chemical nature, especially without affecting the hydroxy acids.

The methods of working the natural hydroxy acids into resinous products follow the usual procedure of making alkyd resins. As a rule the masticated gum is heated with the fatty or resinous acids and the alcohols added then. Instead of alcohols, partially esterified alcohols may be used, which is done by heating the fatty oil with the glycerol in the presence of an alcoholysis catalyst, such as litharge, until the two phases of oil and glycerol merge into a single phase. The procedure may also be carried out in a way as to first heat alcohols and acids together and add the hydroxy acids at a later stage either at once or in small portions. Modification of the product by resins or oils is carried out by adding the modifying agents before, during, or after processing.

In addition to the natural hydroxy acids, polybasic acids are also employed.

So there exists a large variety of substances that can be combined to useful resinous products according to the principles of this invention.

As natural hydroxy acids can be introduced: masticated Congo, Benguela, pontianak, manila, kauri copal and other recent or fossil gums.

As polybasic acids are useable: phthalic anhydride, maleic, citric, succinic, sebacic, acid, etc.

As monobasic acids may be applied either resinous or fatty acids. Representatives of the first group are abietic acid, rosin or fused copal. Representatives of the second group are the fatty acids of linseed oil, wood oil, castor oil, furthermore octadekadiene acid, oleic acid, lauric acid, etc.

As neutral modifying agents may be incorporated: drying and non-drying oils such as linseed, perilla, wood, soya and coconut oil, or neutral resinous substances, such as esterified rosin, resene containing gums and cumarone.

As alcohols, the following prove to be useful: glycerol, glycol, marmitol and other higher alcohols.

The invention will be more fully understood from the following examples.

Example 1

This example describes the simultaneous use of natural hydroxy acids and polybasic acids.

| | Parts |
|---|---|
| Masticated congo | 100 |
| Phthalic anhydride | 50 |
| Wood rosin | 185 |
| Glycerol | 35 | are heated up to 230° C. and held at this temperature for about 30 minutes, until the resin is clear.

This resin possesses the good properties of an alkyd resin in general with the additional feature of high water resistance. It is also easily soluble in other oils.

Example 2

| | Parts |
|---|---|
| Perilla oil | 200 |
| Glycerol | 75 |
| Rosin | 50 | are esterified and alcoholized by heating with

| | Parts |
|---|---|
| Litharge | 1,6 | at 230° C., until the batch is clearly soluble in ethyl alcohol. When this point is reached a mixture of

| | Parts |
|---|---|
| Phthalic anhydride | 125 |
| Masticated congo | 125 | is slowly added. The temperature is held at 230° C., until a small sample taken from the batch remains clear after cooling.

This resinous product has excellent alkyd properties plus the advantage of high weather resistance. It also shows good compatibility with other alkyd resins.

The use of the resinous products obtained by my new process is largely governed by their chemical nature. They are mixed esters combining the properties of the different components in one material.

Owing to this versatility they have a widespread use for protective coatings, impregnating compositions, insulating materials, molding compounds, cements, adhesives, etc. They can be used for all these purposes in accordance with known methods. For example, in coating compositions they are combined with oils, resins, driers, pigments, solvents, or other types of coating materials such as cellulose derivatives.

What I claim is:

1. A process for producing a resin having good film forming properties, high elasticity and good weather resistance which comprises reacting (1) a polyhydric alcohol, (2) a reactive and soluble masticated Congo copal containing a natural resinous hydroxy acid, (3) a monobasic non-hydroxy carboxylic acid selected from a group consisting of fatty oil and resinous acids, and (4) a polycarboxylic acid, at a temperature below the fusing point of untreated copal.

2. A process as set forth in claim 1, wherein the poly-carboxylic acid is phthalic anhydride.

3. A process as set forth in claim 1, wherein the monobasic non-hydroxy acid is rosin.

4. A process as set forth in claim 1, wherein the monobasic non-hydroxy acid is a fatty oil acid.

5. A process as set forth in claim 1, wherein the reaction is carried out at about 230° C.

6. A process for producing a resin having good film forming properties, high elasticity and good weather resistance, which comprises reacting masticated Congo copal, phthalic anhydride, rosin and glycerol by heating the ingredients up to about 230° C. and maintaining this temperature until a clear resin is produced.

7. A resin having good film forming properties, high elasticity and good weather resistance formed by reacting (1) a polyhydric alcohol, (2) a reactive and soluble masticated Congo copal containing a natural resinous hydroxy acid, (3) a monobasic non-hydroxy acid selected from a group consisting of fatty oil and resinous acids, and (4) a poly-carboxylic acid, at a temperature below the fusing point of untreated copal.

WILHELM KRUMBHAAR.